(12) United States Patent
Hsu

(10) Patent No.: US 12,528,026 B2
(45) Date of Patent: Jan. 20, 2026

(54) PIN DISPLAY TOY

(71) Applicant: Great Eastern Entertainment Co., Compton, CA (US)

(72) Inventor: Kent Hsu, Compton, CA (US)

( * ) Notice: Subject to any disclaimer, the term of this patent is extended or adjusted under 35 U.S.C. 154(b) by 378 days.

(21) Appl. No.: 18/113,423

(22) Filed: Feb. 23, 2023

(65) Prior Publication Data

US 2024/0286057 A1 Aug. 29, 2024

(51) Int. Cl.
*A63H 33/38* (2006.01)
*A44C 3/00* (2006.01)
*A47F 7/02* (2006.01)
*A63H 33/08* (2006.01)
*A63H 33/42* (2006.01)

(52) U.S. Cl.
CPC ............ *A63H 33/088* (2013.01); *A44C 3/001* (2013.01)

(58) Field of Classification Search
CPC ........ A63H 3/50; A63H 33/00; A63H 33/088; A63H 33/38; A63H 33/42; A63F 7/02; A44C 3/001; A47G 1/12; G09F 7/10
USPC ............. 446/71, 73, 75, 147, 149, 151, 491; 40/421, 488; 211/85.2, 113; 428/13
See application file for complete search history.

(56) References Cited

U.S. PATENT DOCUMENTS

| | | | | |
|---|---|---|---|---|
| 2,045,864 A * | 6/1936 | Miller | ..................... | G09F 11/23 310/21 |
| 2,564,502 A * | 8/1951 | Radford | ................. | G09B 17/00 273/153 S |
| 3,824,712 A * | 7/1974 | Powell | ................... | G09B 19/10 D11/131 |
| 3,918,180 A * | 11/1975 | Chamberlin | ........... | A63H 33/38 446/151 |
| 4,739,886 A * | 4/1988 | Seaberg | ..................... | A47F 7/02 211/85.2 |
| 5,240,120 A * | 8/1993 | McDonough | ............. | A47F 7/02 211/85.2 |
| 5,398,820 A * | 3/1995 | Kiss | ...................... | A47F 5/0884 211/89.01 |
| 5,671,849 A * | 9/1997 | Bacon | ..................... | A47G 1/12 211/85.2 |
| 5,775,693 A * | 7/1998 | Clancy | .................. | A63F 9/0857 273/153 S |
| 6,409,568 B1 * | 6/2002 | S.o slashed.gaard | .. | B65D 5/503 446/76 |
| 6,796,061 B2 * | 9/2004 | Gemma, Jr. | ......... | G09B 17/003 446/151 |
| 7,117,621 B2 * | 10/2006 | Chang | .................... | B44C 5/005 40/738 |
| 7,377,390 B2 * | 5/2008 | Modesto | .................. | A47F 7/00 206/464 |
| 7,603,802 B2 * | 10/2009 | Oudekerk | ................ | G09F 7/10 40/445 |
| 7,637,377 B1 * | 12/2009 | Peckholdt, Jr. | ........ | A63H 33/42 206/579 |

(Continued)

*Primary Examiner* — Alexander R Niconovich
(74) *Attorney, Agent, or Firm* — Robert McConnell; McConnell Law Firm PC

(57) ABSTRACT

A pin display toy for displaying collectable pins comprised of a display panel and stand. The display panel includes a first movable display area for displaying one or more pins, where the display area rotates around an axis created by a pin post. A second rotatable display area displays one or more additional pins, moves along a track and rotates around an axis formed by a pin post. A third display area, fixed in location, includes multiple pin display locations.

11 Claims, 4 Drawing Sheets

(56) References Cited

U.S. PATENT DOCUMENTS

| | | | | |
|---|---|---|---|---|
| 7,698,836 | B2* | 4/2010 | Schmelzer | A43B 23/24 |
| | | | | 36/137 |
| 8,191,713 | B2* | 6/2012 | Calendrille, Jr. | A63H 3/50 |
| | | | | 446/314 |
| 8,813,402 | B2* | 8/2014 | Ponce | A45F 3/00 |
| | | | | 190/102 |
| 9,120,030 | B2* | 9/2015 | Lam | G09B 17/00 |
| 9,149,730 | B1* | 10/2015 | Hauser | A63H 3/50 |
| 9,603,439 | B2* | 3/2017 | Nakamura | A43B 23/24 |
| 11,135,526 | B1* | 10/2021 | Fields | A47F 5/0884 |
| 12,185,820 | B2* | 1/2025 | Xu | A45F 3/04 |
| 2007/0085269 | A1* | 4/2007 | Martin | A63F 9/10 |
| | | | | 273/157 R |
| 2009/0107021 | A1* | 4/2009 | Koeppel | A45C 13/02 |
| | | | | 428/542.2 |
| 2014/0194029 | A1* | 7/2014 | Pardi | A63H 33/003 |
| | | | | 446/71 |
| 2019/0126162 | A1* | 5/2019 | Barrios | A63H 3/50 |
| 2019/0321738 | A1* | 10/2019 | Chambers | A63H 3/00 |
| 2020/0015605 | A1* | 1/2020 | Thornberry | A47F 7/02 |
| 2020/0397156 | A1* | 12/2020 | Kempner | A45C 11/16 |

* cited by examiner

PIN DISPLAY TOY

BACKGROUND OF THE INVENTION

Field of the Invention

The invention relates to toys designed to display collectable items, particularly collectable pins. These pins are ornamental and can indicate a wearer's enjoyment of a character or affiliation with a cause/interest. They are often worn on clothing, bags or other fabric areas. The pin may also be displayed on a device designed specifically for displaying collectable pins. These pins are sometimes referred to as lapel pins.

A pin of this type is generally comprised of two parts. The first part of a pin has two sides: 1) a front side for displaying an image, logo or design and 2) a rear side with a pin. The pin is generally a thin post that can be pressed through fabric. The second part couples with the pin/post on the first part to secure the pin to fabric or a location. The second part is often referred to as a clasp or clutch.

The front side of the pin can display any number of different types of designs including symbols of achievement, organizational, business, political and school affiliation, as well as various characters including cartoon, anime, television, movie or other popular culture topics. These designs are formed on the front of a pin using a variety of manufacturing processes including cloisonne, enamel, photo etching, photo dome, screening printing and four color process. Other manufacturing methods can be used as well.

The second part of the pin, the clasp that couples with the pin/post of the first part, can be one of a variety of different types including butterfly clutch, jewelry clutch, safety clasp, magnetic clasp, screw and nut, and stick pin.

The pin can be pressed through clothing, bags, or other locations. It can also be fit through pin display stands that are specifically designed for display of collectable items. As collecting pins of various cartoon, anime, tv/movie or other characters has become a popular pastime, collectors are often looking for unique and interesting ways to display their pins. The present invention relates to a movable toy that can also display collectable pins.

SUMMARY OF THE INVENTION

A pin display toy for displaying collectable pins is shown. Pin display toy is comprised of a display panel and stand. The display panel includes a first movable display area for displaying one or more pins, where the display area rotates around an axis created by a pin post. A second rotatable display area displays one or more additional pins, moves along a track and rotates around an axis formed by a pin post. A third display area includes multiple pin display locations. This third display area is fixed in location but could include movement actions in other embodiments.

The pin display toy is formed of plastic with designs printed on the plastic using methods well known in the art. The pins for display include a design on the front side and a pin post on the rear. The pin is secured to a location using a clasp that couples to the pin post.

DESCRIPTION OF THE PREFERRED EMBODIMENT

The following detailed description refers to the preferred embodiment of the disclosed invention as shown in the attached figures and in the below description. This detailed description is not meant to limit the scope of the invention in any way but is intended to disclose the preferred embodiment/best mode of the invention at the time of filing this application.

Figure 1:
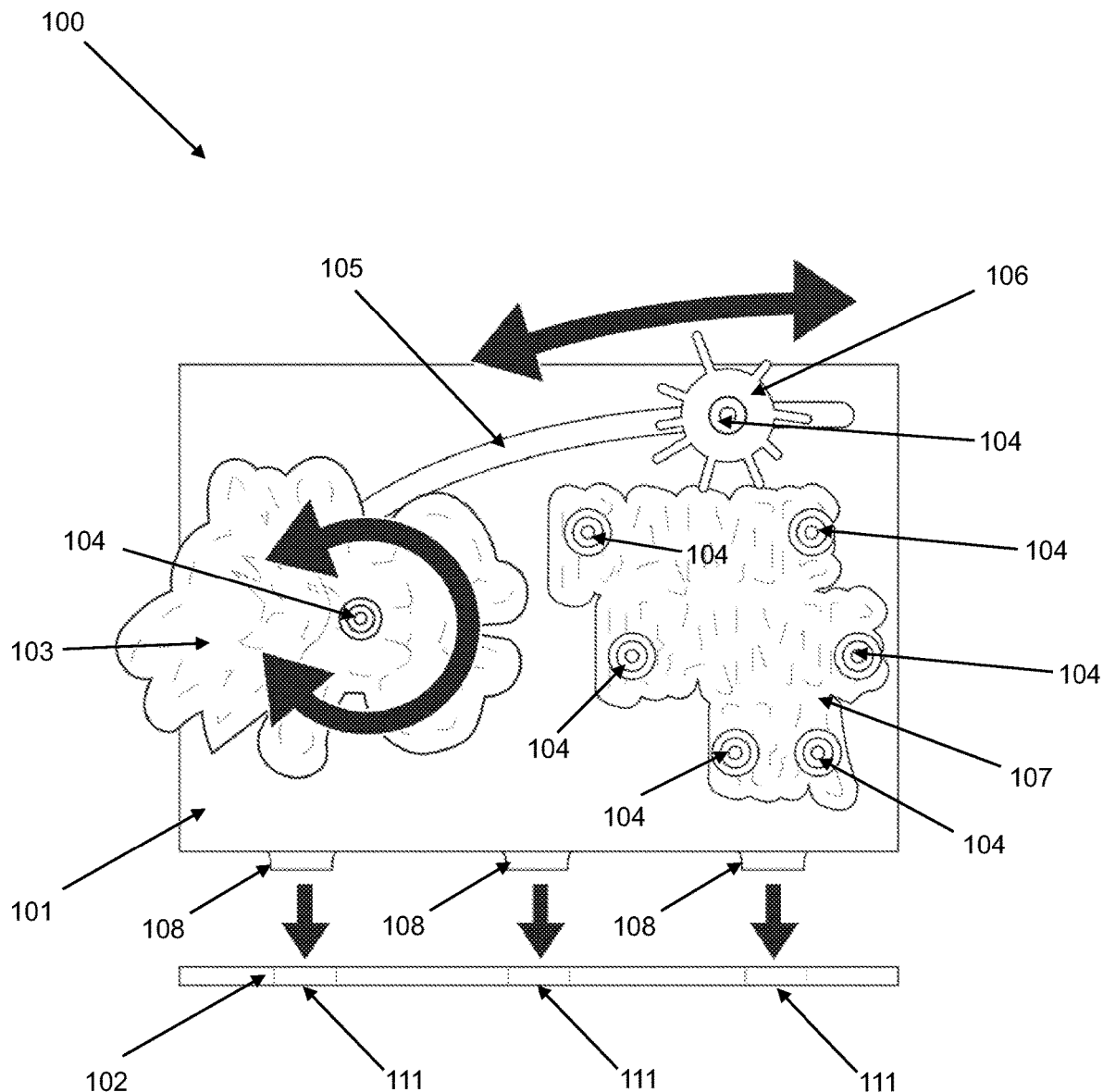
FIG. 1 is a front view of the pin display toy.

FIG. 1 is front view of the pin display toy 100 with all the device components displayed. Pin toy display 100 is comprised of stand 102, display panel 101, a first rotatable display area 103, a second rotatable display area 106, third display area 107, track 105 and various pin display locations 104. Stand 102 provides support for display panel 101. Display panel 101 couples with stand 102 utilizing three tabs 108 that couple with slots 111 located in stand 102. Display panel provides a display area for a character, scene or any other visual material wished to be displayed and may include a graphic design.

First rotatable display area 103 provides a display area for a character, scene or any other visual material wished to be displayed. The first display area may include a graphic design and may be formed in a specific shape to represent a character, scene or any other visual material wished to be displayed. In this embodiment, first rotatable display area 103 also includes a single pin display location 104, but any number of such pin display locations 104 could be included. First rotatable display area 103 is attached to display panel 101 utilizing a plug that doubles as a routing location for a pin post. First rotatable display area 103 rotates around this plug to provide entertainment and play action for the pin display toy 100.

Second rotatable display area 106 provides a display area for a character, scene or any other visual material wished to be displayed. The second display area may include a graphic design and may be formed in a specific shape to represent a character, scene or any other visual material wished to be displayed. Second rotatable display area 106 also includes a single pin display location 104 but could include more than one pin display location 104 if desired. Second rotatable display area 106 is attached to display panel 101 utilizing a plug that is a routing location for a pin post. Second rotatable display area 106 rotates around the attachment point plug and pin display location 104 to provide additional entertainment and play action for the pin display toy 100. Further, second rotatable display area 106 moves along track 105, in this preferred embodiment a slot cut out of display panel 101. The attachment plug that couples the second rotatable display area 106 to display panel 101 is sized to fit within track 105 to allow second rotatable display area 106 to move along track 105 and rotate around its axis.

Third display area 107 provides a third display area for a character, scene or other visual material wished to be displayed. The third display area may include a graphic design and may be formed in a specific shape to represent a character, scene or any other visual material wished to be displayed. This area includes multiple pin display locations 104, in the preferred embodiment six. Further, third display area 107 is attached to display panel 101 with multiple plugs but is fixed in location.

The component parts of pin display toy 101 are made of plastic in the preferred embodiment. These plastic components have character, scene or other visual material printed on the plastic, either on the front or the back. While plastic is used in the preferred embodiment, any suitable material could be used such as PVC, acrylic, polycarbonate, plexiglass, various metals, wood or any other rigid or semi-rigid material well known in the art. Any method well known in the art to fix character, scene or other visual material to the substrate material could be used. Methods well known in the art such as CNC cutting, molding, 3d printing and any other can be used to form the various components of display toy 101.

Figure 2:
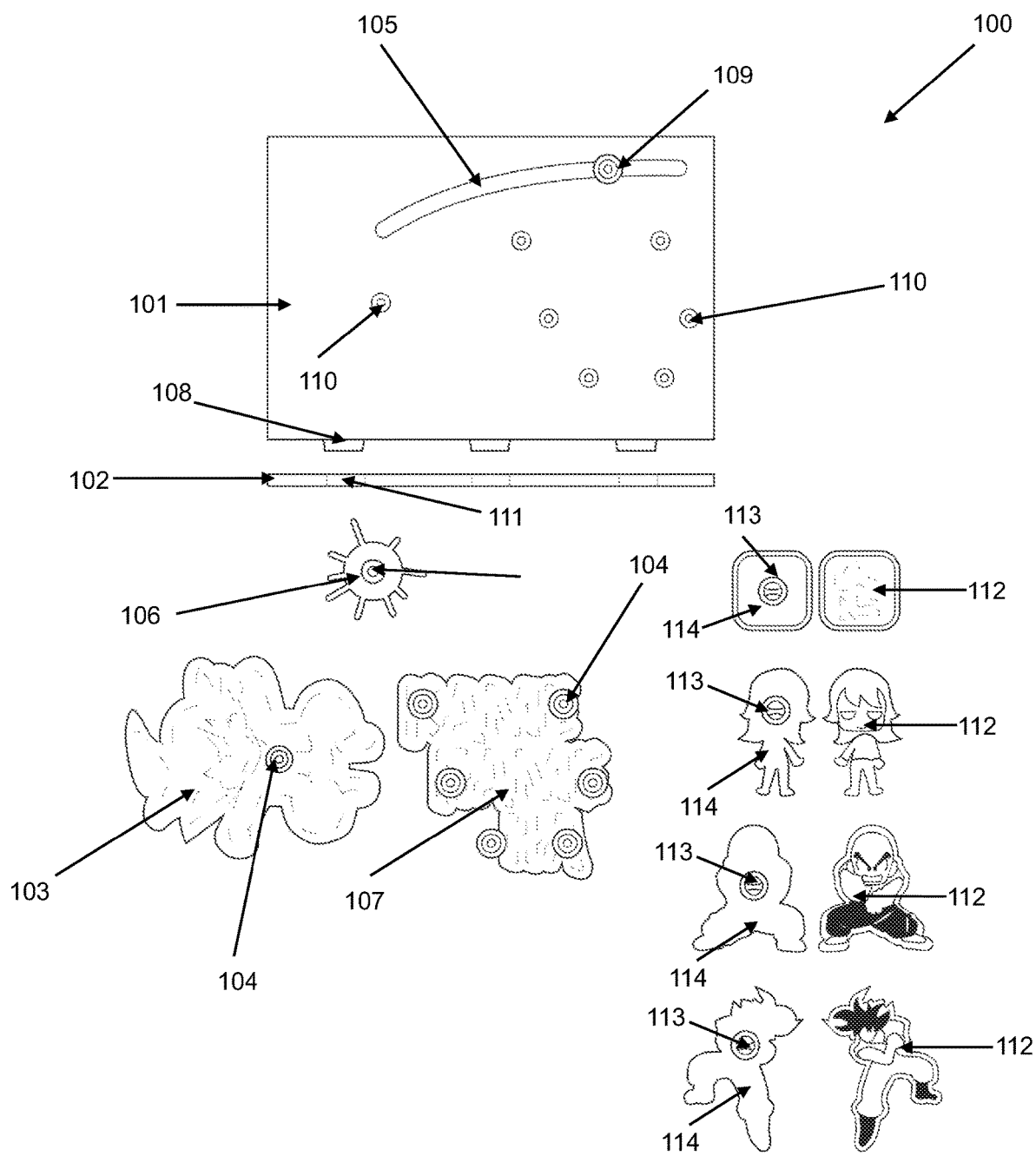
FIG. 2 is a view of the component parts of the pin display toy.

FIG. 2 shows the component parts of pin display toy 100. In this view, first rotatable display area 103, second rotatable display area 106 and third display area 107 are not installed on display panel 101. Track plug 109 is shown in track 105. Track plug 109 fits in the open slot of track 105 and allows movement up and down track 105. Track plug 109 also allows rotation around its center axis. Plugs 110 are also shown in this view. They couple with the rear of pin display location 104 to secure the first rotatable display area 103 and third display area 107 to display panel 101.

The front and rear of various pins 112 are also shown in this view. Each pin 112 also has a rear pin side 114 and a clasp 113. The clasp fits over and couples to the pin post 115 (shown in FIG. 3) to secure the pin to the location chosen by the user. Pin 112 can display any number of different types of designs including symbols of achievement, organizational, business, political and school affiliation, as well as various characters including cartoon, anime, television, movie, or other popular culture topics. These designs are formed on the front of pin 112 using a variety of manufacturing processes including cloisonne, enamel, photo etching, photo dome, screening printing and four-color process. Other manufacturing methods well known on the art may also be utilized. Pin clasp 113 may be one of a variety of different types including butterfly clutch, jewelry clutch, safety clasp, magnetic clasp, screw and nut, and stick pin.

Figure 3:
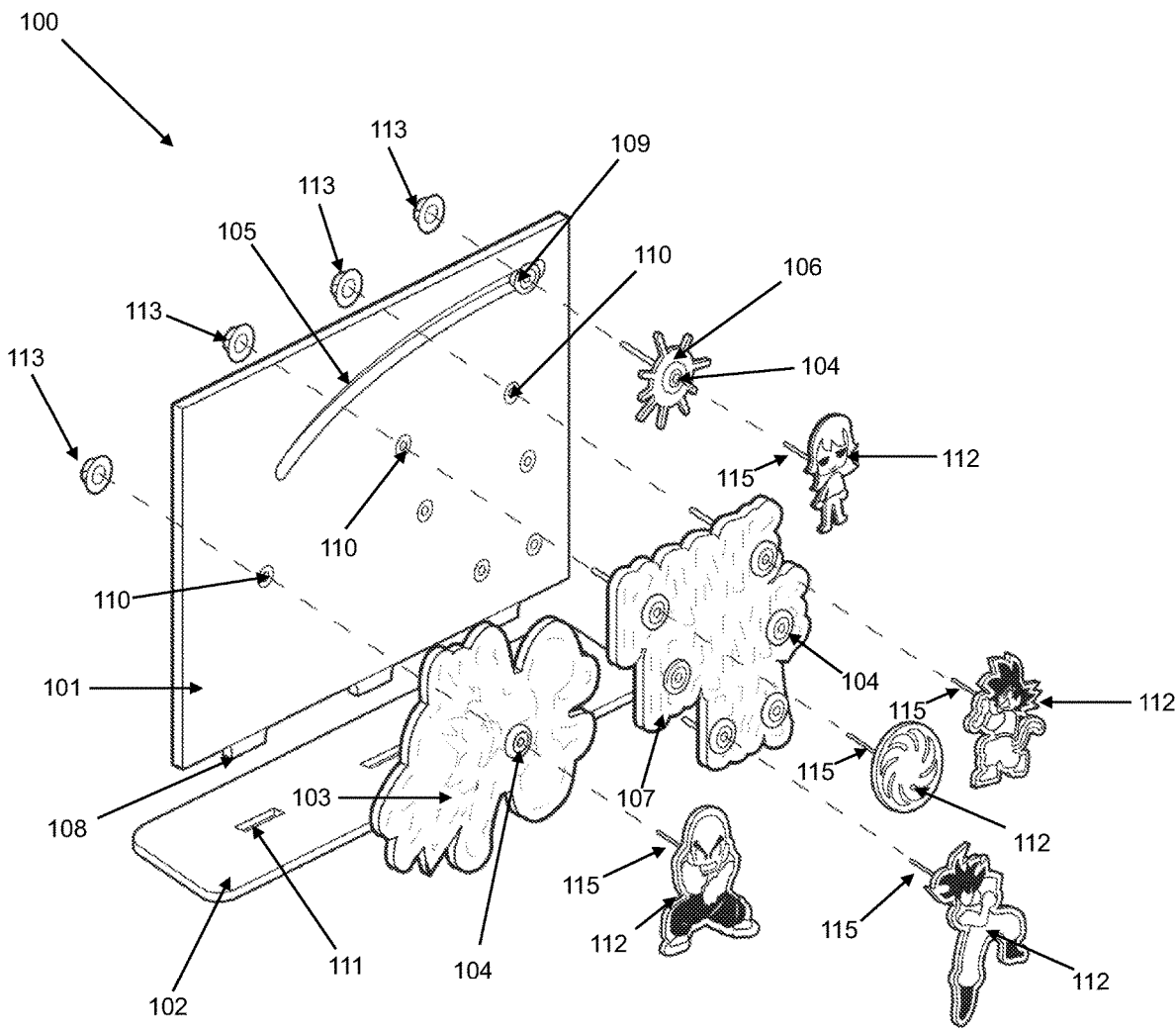
FIG. 3 is an expanded perspective view of the pin display toy.

FIG. 3 shows an expanded perspective view of pin display toy 100 with its component parts shown disassembled. First rotatable display area 103 is shown disengaged from display panel 101. In this view, the attachment method of pin 112 to first rotatable display area 103 and through display panel 101 is shown. Pin post 115 is routed through pin display location 104, then through plug 110 and secured to pin display toy 100 with clasp 113. First rotatable display area 103 may then be rotated around the axis formed with pin post 115 and plug 110 resulting in a movement action for pin display toy 100.

Second rotatable display area 106 is also shown disengaged from display panel 101. Here, pin post 115 of pin 112 is routed through pin display location 104, track plug 109 and then secured to the pin display toy 100 with clasp 113. In this configuration, second rotatable display area 106 rotates around the axis of pin post 115 that is routed through track plug 109. Further, track plug 109 is movable up and down track 105 for an additional movement action for the pin display toy 100.

Third display area 107 is also shown disengaged from display panel 101. Here two pins 112 are shown with their respective pin posts 115 to be routed through pin display locations 104 and plugs 110. Pins 112 are secured with clasps 113. In this configuration, third display area 107 does not include a movement action, but a configuration where this display area includes movement would be possible.

While many of the components are shown disengaged from display panel 101, in the preferred embodiment, only pins 112 are removable by a user. However, other configurations that have removable and replaceable panels are possible.

Figure 4:
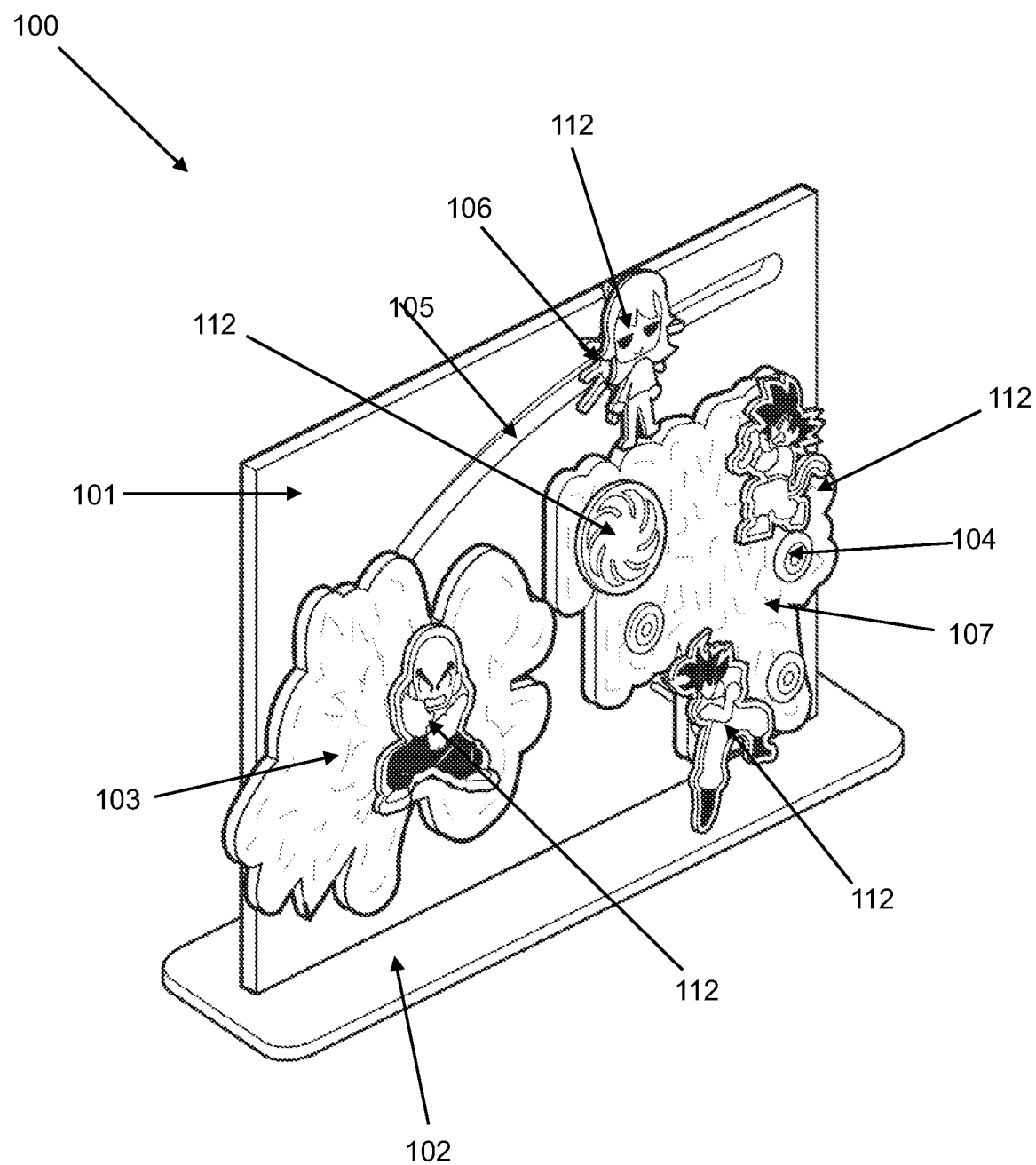
FIG. 4 is a perspective view of the assembled pin display toy.

FIG. 4 shows a perspective view of pin display toy 100 with various pins 112 installed. In this view, first rotatable panel 103 has pin 112 installed. With pin 112 installed, first rotatable panel 103 rotates around the axis formed by pin post 115 for pin 112. Second rotatable panel 106 is shown with pin 112 installed in pin display location 104. Second rotatable panel 106 rotates around the axis formed by pin post 115 of pin 112 and along track 105. Lastly, third display area 107 includes two pins 112 installed in pin display locations 104. Third display area 107 is fixed in position in this embodiment but embodiments where third display area 107 includes a movement action are possible with the present invention.

Although the present invention has been described in relation to the above disclosed preferred embodiment, many modifications in design, implementation, systems and execution are possible while still maintaining the novel features and advantages of the invention. The preferred embodiment is not meant to limit the scope of the patent in any way, and it should be given the broadest possible interpretation consistent with the language of the disclosure on the whole.

The invention claimed is:

1. A toy for displaying pins comprising:
   one or more pins, each pin comprising a display surface with a first side for display and a second side coupled to a post where the post is oriented perpendicularly to a character display surface and a removable backing for coupling to the post;
   a vertically oriented display panel with an upper edge and a lower edge, wherein the lower edge comprises one or more tabbed protrusions;
   a horizontally oriented and planar display stand with one or more openings shaped to couple with the one or more tabbed protrusions of the display panel;
   a first display area with at least one pin display location, where the pin display location comprises an opening sized to couple with the post, where the first display area includes a first graphic design and where the first display area is moveable in a first movement direction;
   a second display area with at least one pin display location, where the pin display location comprises an opening sized to couple with the post, where the second display area includes a second graphic design and where the second display area is fixed to a track and is moveable in a second movement direction along the track, and where the second display area is also moveable in a third movement direction; and
   a third display area with at least one pin display location, where the pin display location comprises an opening sized to couple with the post.

2. The toy of claim 1 where the display panel includes a display panel graphic design.

3. The toy of claim 1 where the first display area is formed of a first shape.

4. The toy of claim 1 where the second display area is formed of a second shape.

5. The toy of claim 1 where the third display area is formed of a third shape.

6. The toy of claim 1 where the first movement direction is rotation.

7. The toy of claim 1 where the third movement direction is rotation.

8. The toy of claim 1 where the third display area is moveable in a fourth movement direction.

9. The toy of claim 1, where the toy is made from a material selected from the group consisting of plastic, PVC, acrylic, polycarbonate, plexiglass, metals, and wood.

10. The toy of claim 1 the toy is manufactured using a method selected from the group consisting of CNC cutting, molding and 3d printing.

11. The toy of claim 1 where the second display area is coupled to the track with a track plug.

\* \* \* \* \*